United States Patent [19]

Barbeau

[11] 4,434,621

[45] Mar. 6, 1984

[54] ENGINE FUEL SYSTEM

[75] Inventor: Dennis E. Barbeau, Lambertville, Mich.

[73] Assignee: Teledyne Industries, Inc., Los Angeles, Calif.

[21] Appl. No.: 299,393

[22] Filed: Sep. 4, 1981

[51] Int. Cl.³ ............................................. F02C 7/232
[52] U.S. Cl. .................................... 60/734; 137/68 A
[58] Field of Search ................. 60/734, 740, 741, 736, 60/39.08; 137/569, 625.29, 625.47, 68 A, 69; 244/135 R

[56] References Cited

U.S. PATENT DOCUMENTS

| 2,256,144 | 9/1941 | Gifford et al. | 137/569 |
| 2,851,863 | 9/1958 | Theed | 60/736 |
| 3,374,954 | 3/1968 | Card | 239/265.17 |
| 4,175,527 | 11/1979 | Sanada et al. | 123/514 |

FOREIGN PATENT DOCUMENTS 609015 5/1978 U.S.S.R. .......................... 137/68 A

Primary Examiner—Louis J. Casaregola
Assistant Examiner—Timothy S. Thorpe
Attorney, Agent, or Firm—Gifford, VanOphem, Sheridan, Sprinkle & Nabozny

[57] ABSTRACT

A unique fuel system for supplying fuel from a fuel source and to a turbine engine is disclosed and comprises a fuel inlet conduit having one end adapted for connection with the fuel source and a fuel outlet conduit having one end adapted for connection with the turbine engine. The other end of the inlet and outlet conduits are connected to a valve movable between a bypass and operating condition. Both ends of a third conduit are also connected to the valve while a fuel pump is fluidly connected in series with and at a midpoint of a third conduit. In its bypass position, the valve fluidly connects the inlet and outlet conduits together while simultaneously sealingly closing the third conduit and entrapping any fuel contained therein. In its operating condition, the valve simultaneously connects the inlet conduits with one end of the third conduit and the other end of the third conduit to the outlet conduits thus supplying fuel to the engine.

8 Claims, 5 Drawing Figures

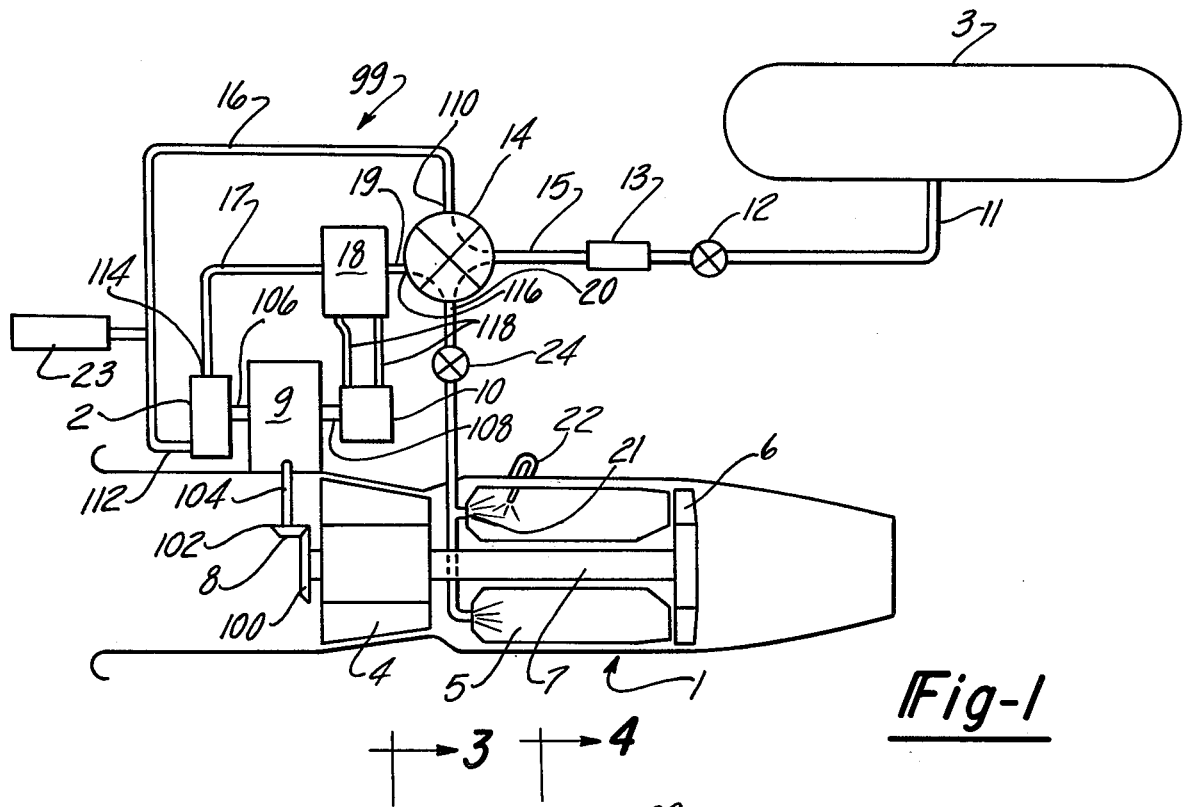
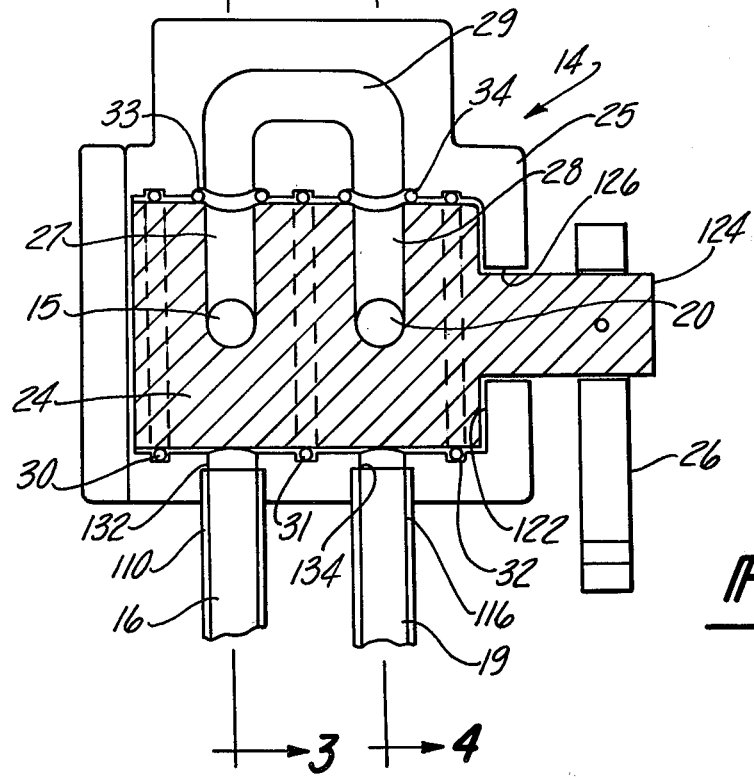
Fig-1
Fig-2

ENGINE FUEL SYSTEM

BACKGROUND OF THE INVENTION

I. Field of the Invention

The present invention relates generally to engine fuel systems and, more particularly, to a fuel system for a turbine engine.

II. Description of the Prior Art

In certain types of turbine engines, such as turbine engines used in cruise missile systems, the engine is stored for long periods of time without use and yet must be ready for subsequent launch without special maintenance, handling or launch preparation. Furthermore, the cruise missile and its engine are operated only a single time which terminates in the destruction of the missile. Consequently, it is particularly important that the cost associated with the engine installation, maintenance and handling be minimal but, at the same time, enjoy a very high system reliability.

Previously, it has been difficult to obtain a low cost and yet highly reliable fuel system with respect to the simplicity of the initial installation of the fuel system, the simplicity of the fuel system during operation and also the sequencing for engine start up. In particular, it is highly desirable that the engine be capable of installation in the cruise missile with only a single fuel connection between the missile air frame and the engine fuel system. The fuel tank, of course, is conventionally contained within the missile air frame. In addition, it is highly desirable that no special installation operation, such as purging the air from the fuel system, be required after the installation of the engine in the air frame.

Additionally, in a cruise missile system, it is necessary that the turbine engine reach its maximum engine thrust in an extremely short time after the point of launch of the missile. In order to achieve this, the engine and air frame fuel systems, lines fittings and fuel handling components must be completely filled and purged of air prior to engine starting upon launching of the missile. Unless the air is purged from the fuel system, an engine flame out can occur. If engine flame out occurs after the launch of the cruise missile, it would result in the premature destruction of the missile.

In order to prevent an engine flame out, the fuel must reach the turbine combustor at the time that the engine start and ignition sequence begins. The time available for fueling and purging air from the engine fuel system, however, is usually less than a few seconds and with many types of fuel pumps, such as positive displacement pumps of hydromechanical systems, it is difficult to meet this requirement and at the same time minimize the cost of the engine. Complex fuel systems are further disadvantageous in that such systems oftentimes include flow restrictions in which air pockets can form. Such entrapped air is later released as bubbles into the fuel flow which can shut down the engine. In addition, the fuel pumping rate of these previously known systems during engine start is generally inadequate to fill the system in sufficient time for fuel to reach the turbine combustor at the initiation of engine ignition.

SUMMARY OF THE PRESENT INVENTION

The present invention overcomes the above-mentioned disadvantages of the previously known fuel system by providing a fuel system which is simple and inexpensive in both installation and cost while ensuring that air-free fuel is delivered to the engine in an extremely short time after activation of the fuel system.

In brief, the fuel system according to the present invention comprises a fuel inlet conduit having one end adapted for connection with a source of fuel. The fuel tank for a cruise missile is conventionally contained within the missile air frame and a suitable fluid connector on the fuel inlet conduit connects the inlet conduit with the missile air tank.

A fuel outlet conduit has one end adapted for connection with the fuel port of the engine. This fuel port is open to the fuel injectors in the turbine engine combustor.

The other ends of the inlet and outlet conduit are connected to a valve assembly actuatable between a bypass position and an operating position. In addition, a third conduit has a first and second end both of which are connected to the valve assembly. A fuel pump is fluidly connected in series with and at a midpoint of the third conduit so that actuation of the fuel pump pumps fuel from the first end towards the second end of the third conduit.

When the valve means is in its bypass position, the fuel inlet and outlet conduit are directly connected to each other and, simultaneously, the valve assembly sealingly closes both ends of the third conduit so that the fuel contained within the third conduit remains entrapped therein. Conversely, when the valve means is moved to its operating position, i.e., the position necessary to operate the engine, the valve means fluidly connects the third conduit in series between the inlet and outlet conduits. Upon doing so, the fuel pump pumps fuel from the fuel tank and to the turbine engine in the desired fashion.

Prior to the installation of the fuel system within the engine, it is necessary to first charge or fill the third conduit with fuel while the bypass valve is in its operating position and, when filled, to move the valve means to its bypass position thus entrapping fuel within the third conduit. However, since the turbine engine for cruise missiles are pretested prior to installation in the cruise missile, the third conduit can be easily and conveniently filled with fuel and sealed at the completion of the test.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a diagrammatic view illustrating a preferred embodiment of the fuel system according to the present invention;

FIG. 2 is a partial diagrammatic view of the preferred embodiment of the fuel system according to the present invention;

DETAILED DESCRIPTION OF A PREFERRED EMBODIMENT OF THE PRESENT INVENTION

Figure 3:
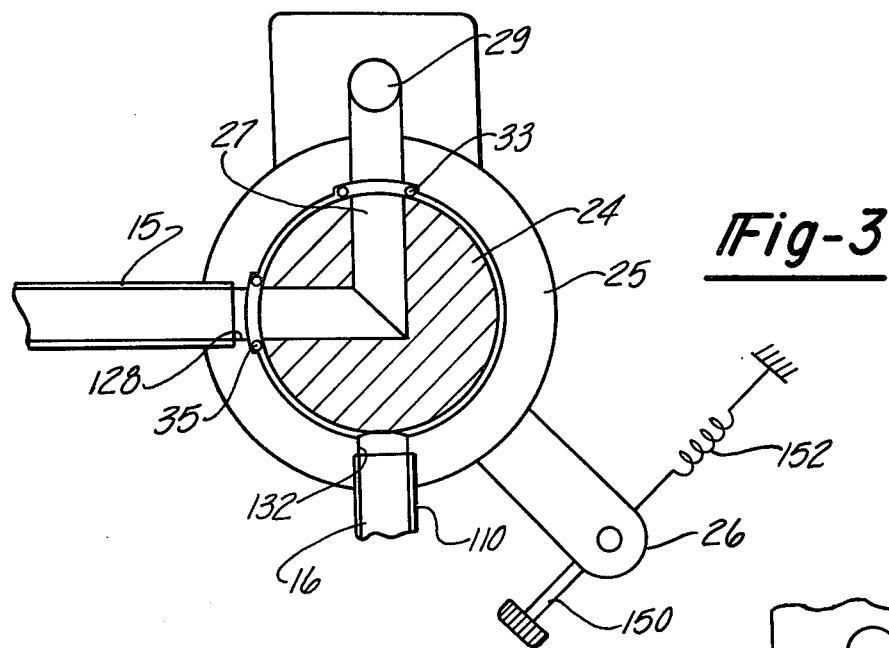
FIG. 3 is a longitudinal sectional view showing one portion of the preferred embodiment of the invention.

With reference first to FIG. 1, a diagrammatic view illustrating a preferred embodiment of the fuel system according to the present invention is thereshown for supplying fuel from a fuel tank 3 and to a turbine engine 1. The fuel system of the present invention is designed for use in a cruise missile and, as such, the fuel tank 3 is contained within the missile air frame (not shown). The fuel tank 3 includes an outlet fuel line 11 having one end connected to the fuel tank 3 and a shut off valve 12 adjacent its other end. The air frame also includes means to pump fuel from the tank 3 and into the fuel line 11, such as pressurization of the tank 3, but, since this forms no part of the present invention it will not be further described.

The turbine engine 1 includes an engine shaft 7 having a turbine 6 at one end and a compressor 4 at its other end. A combustor or combustion chamber 5 is formed within the turbine engine housing while fuel injectors 21 are open to the combustion chamber 5. Conventional fuel ignition means 22 are mounted to the turbine engine housing for igniting fuel within the combustion chamber 5.

Still referring to FIG. 1, the turbine engine includes a bevel gear set 8 having a first gear 100 rotatably driven by the engine shaft 7. The gear 100 meshes with a second gear 102 which powers a gear box 9 via a shaft 104. The gear box 9 includes two output shafts 106 and 108 which respectively rotatably drive a fuel pump 2 and an oil pump 10.

The fuel system further includes a fuel inlet conduit 15 having a fluid connector 13 attached at one end. This connector 13 is adapted for connection with the free end of the fuel line 11 from the fuel tank 3 while the other end of the inlet conduit 15 is fluidly connected to a valve 14. The valve 14 will be subsequently described in greater detail.

The fuel system also includes a fuel outlet conduit 20 having one end connected to the fuel injectors 21 of the turbine engine 1 and its other end connected to the valve 14. In addition, the conduit 20 can include a fuel shut off valve 24 in lieu of the main shut off valve 12 on the fuel tank line 11 as will also be subsequently described in greater detail.

Still referring to FIG. 1, a fuel line 16 is attached at one end 110 to the valve 14 and has its other end 112 fluidly connected to the inlet of the pump 2. The outlet 114 of the pump 2 is connected by a line 17 to the inlet 18 of an oil cooler 18 while the outlet from the oil cooler 18 is connected by a line 19 at its end 116 to the valve 14. The fluid line 16, 17 and 19 together form a third conduit 99 having both its first end 110 and second end 116 connected to the valve 14.

An expansion bottle 23 is fluidly connected to the third conduit in order to permit relative expansion of any fuel entrapped within the third conduit. In addition, oil lines 118 extend between the oil pump 10 and oil cooler 18 to circulate oil through the oil cooler 18 as required.

Figure 4:
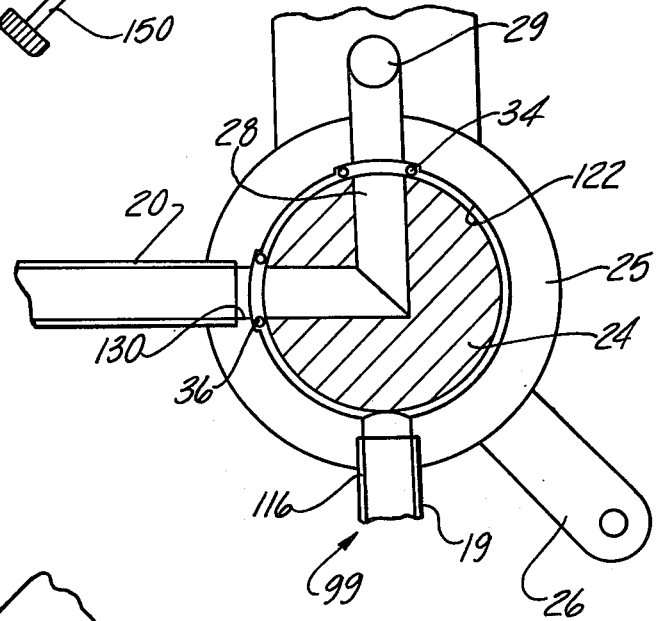
FIG. 4 is a cross sectional view taken substantially along line 4—4 in FIG. 2 and showing the valve means in one position.

With reference now to FIGS. 2-4, the valve 14 is thereshown in greater detail and comprises a valve housing 25 defining an interior cylindrical chamber 122. A cylindrical rotor 24 is rotatably mounted within the chamber 122 and includes an axially extending stem 124 which protrudes outwardly through an opening 126 at one end of the valve housing 25. A lever 26 is attached to the stem 124 to actuate the valve 14 in the manner to be shortly described.

The fuel inlet line 15 which adapted to be connected with the air frame fuel tank 3 intersects and is fluidly connected to a port 128 (FIGS. 2 and 3) on one side of the valve housing 25. Similarly, the fuel outlet conduit 20 (FIGS. 2 and 4) is also connected to a fuel port 130 in the valve housing 25 at a position aligned with but axially spaced from the inlet conduit 15. As is best shown in FIG. 2, the first end 110 of the line 16 is also connected to the valve housing 25 via a port 132 at a position axially aligned with but circumferentially spaced from the fuel inlet port 128. The other or second end 116 of the fluid line 19 is fluidly connected to a valve port 134 at a position axially aligned with and circumferentially spaced from the port 130 for the fuel outlet conduit 20.

As is best shown in FIGS. 3 and 4, a first fuel passage 27 is formed in the rotor 24 so that the passage 27 ducts fuel through an angle of 90° although other angles may be used. Thus, with the rotor 24 in the position shown in FIG. 3, the fuel passage 27 ducts fuel from the fuel inlet conduit 15 and to a cross passage 29 (FIG. 2) formed in the valve housing 25. As shown in FIGS. 2 and 4, a second passage 28 in the rotor 24 also ducts fuel through an angle of 90° and, when in the position shown in FIG. 4, ducts fuel from the cross passage 29 and to the fuel outlet conduit 20.

The valve rotor 24 is illustrated in FIGS. 2-4 in its bypass position in which the fuel inlet conduit 15 is fluidly connected with the outlet conduit 20. Simultaneously, the rotor 24 sealingly closes the first end 110 and the second end 116 of the third conduit 99 thus entrapping any fuel within the third conduit. In addition, appropriate seal members 30, 31 and 32 (FIG. 2) fluidly seal the valve rotor 24 to the valve housing 25. Further fluid seals 33, and 34 fluidly seal the cross passage 29 to the rotor 24 while seals 35 and 36 (FIGS. 3 and 4) respectively fluidly seal the inlet conduit 15 and outlet conduit 20 to the rotor 24. Preferably, no fluid seals are provided between the third conduit 99 in the rotor 24 so that during initial fuel flow through the valve 24, the space between the valve rotor 24 and its housing 25 becomes filled with fuel.

Figure 5:
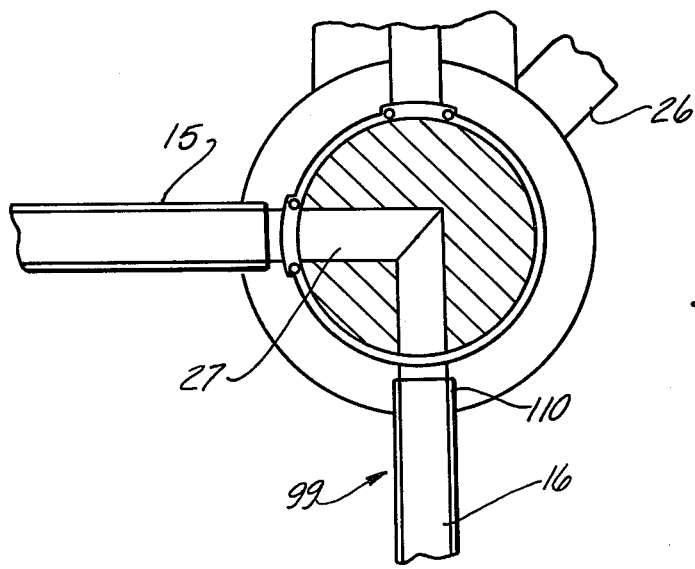
FIG. 5 is a cross sectional view similar to FIG. 4 but showing the valve in a second operative position.

With reference now particularly to FIG. 5, when the valve actuator or lever 26 is moved in a counterclockwise direction to the position shown in FIG. 5, the valve passage 27 connects the inlet conduit 15 with the first end 110 of the line 16 of the third conduit 99. Simultaneously, the other valve passageway 28 fluidly connects the second end 116 of the line 19 of the third conduit 99 to the fuel outlet conduit 20 to the turbine engine. Thus, as the valve 24 is moved from its first or bypass position and to its second or operating position, the valve 14 automatically fluidly connects the third conduit 99 comprising the lines 16, 17 and 19 in series and in between the fuel inlet conduit 15 and outlet conduit 20 and so that the fuel pump 2, upon activation, supplies fuel from the fuel tank 3 and to the turbine engine.

In operation, the turbine engine 1 is first tested prior to its installation in the cruise missile. To do this, the valve 14 is moved to the operating position and the fuel inlet conduit connector 13 is coupled to a source of fuel. During the initial testing of the engine 1, the third conduit 99, i.e., the lines 16, 17 and 19, becomes completely filled with the fuel. When the acceptance test is completed, the valve 14 is moved to its bypass position whereupon the valve 14 automatically sealingly closes the ends 110 and 166 of the third conduit 99 thus entrapping the fuel contained within the third conduit 99 as well as with the fuel pump 2 oil cooler 18 and their associated components. At this time, the main shut off valve 24 on the outlet conduit 20, if used, is closed thus completely filling the fuel supply line up to the shut off valve 24.

The turbine engine 1 is then installed within the missile air frame and its inlet fuel connector 13 is attached to the air frame fuel supply in the conventional fashion. During this time, the fuel system remains filled with fuel up to the shut off valve 24, if used, and if not used up to the valve 14. The expansion bottle 23 allows for thermal expansion of the fuel within the fuel system during the storage period.

In the event that the main shut off valve 24 is used in lieu of the shut off valve 12, upon connection of the engine fuel system to the air frame system, the air frame fuel tank 3 will be pressurized to drive fuel through the system and purge the system of air. However, since the valve 14 is in the bypass position, only the inlet conduit 15 and outlet conduit 20 up to the valve 24 and the passages in the valve 14 must be purged of air. This is relatively easy to accomplish since it is required only to fill fuel lines and fuel passages within the valve 14 rather than fuel handling devices, such as a pump 2.

When launch of the cruise missile is necessary, the main shut off valve 12 or 24 is first opened whereafter the pressurization of the air frame fuel tanks rapidly purges any air remaining within the inlet conduit 15 or outlet conduit 20. At a predetermined time following the opening of the valve 12 of 24, and at the time that the fuel is entering the combustion fuel nozzles 21, the valve 14 is rotated to its operating position and the engine start sequencing is initiated. Engine starting is initiated by the rotation of the engine shaft 7 by means of power through the gear box 9 or other conventional means, and the fuel is ignited by the igniter 22.

Although any conventional means, such as hydraulic, electrical or pneumatic, may be used to rotate the valve lever 24, preferably a spring 152 (FIG. 3) is attached to the valve lever 26 urging the valve lever 26 towards its operating position. In addition, a pyrotechnic device 150 holds the valve lever 26 in its off position and then, when severed, allows the spring to rotate the valve 14 to its operating position. This is particularly desirable for a cruise missile application since it can be connected to and actuated by the same device that initiates the engine start sequencing. Thus, by using a pyrotechnic device, it can be connected to the same device that rotates the engine shaft 7 and activates the ignitor 22. Consequently, only one device is required to accomplish all three engine start processes.

It can thus be seen that the fuel system according to the present invention is advantageous in that it eliminates air pockets within the fuel line which otherwise could result in engine flame out. Furthermore, since the fuel system is substantially entirely filled with fuel at the start of the launch sequence, full fuel delivery to the engine is achieved in an extremely short time, for example, a second, after initiation of the launch sequence.

The fuel system of the present invention is further advantageous in that the overall fuel system is simple and relatively inexpensive in construction and yet achieves the high reliability required for cruise missile applications.

Having described my invention, however, many modifications thereto will become apparent to those skilled in the art to which it pertains without deviation from the spirit of the invention as defined by the scope of the appended claims.

I claim:

1. A fuel system for an engine having a fuel port comprising:
   a fuel inlet conduit having one end adapted for connection with a source of fuel,
   a fuel outlet conduit having one end adapted for connection with the engine fuel port,
   a valve means, the other ends of said fuel inlet conduit and fuel outlet conduit being fluidly connected to said valve means,
   a third conduit having a first and second end fluidly connected to said valve means,
   fuel pump means connected in series with and at a midpoint of said third conduit for pumping fuel through said third conduit from its first end and towards its second end,
   said valve means being actuatable between a bypass position and an operating position, wherein in said bypass position said valve means fluidly connects said other ends of said fuel inlet and fuel outlet conduits and simultaneously sealingly closes said first and second ends of said third conduit, and wherein in said operating position said valve means fluidly connects said fuel inlet conduit with the first end of the third conduit and simultaneously fluidly connects said second end of the third conduit with the fuel outlet conduit.

2. The invention as defined in claim 1 and comprising means for enabling thermal expansion of fuel entrapped within said third conduit when said valve is in said bypass position.

3. The invention as defined in claim 1 and comprising a shut off valve connected in series with and at a midpoint of said fuel outlet conduit.

4. The invention as defined in claim 1 wherein said valve means further comprises a valve body having a cylindrical chamber, a cylindrical rotor rotatably mounted within said chamber, and means for connecting said conduits to said valve body so that said conduits are open to said rotor.

5. The invention as defined in claim 4 wherein said rotor includes two axially spaced pairs of intersecting passages which selectively register with said conduits as said rotor is rotated between said bypass and said operating positions.

6. The invention as defined in claim 5 and including means for fluidly sealing said rotor to said ends of said third conduit.

7. The invention as defined in claim 1 wherein said valve means includes a valve actuator and means for moving said valve actuator between said bypass and said operating condition comprising a pyrotechnic device normally holding said valve actuator in said bypass position and resilient means urging said valve actuator towards said operating position.

8. The invention as defined in claim 4 wherein said valve rotor comprises a first pair of intersecting passages and a second pair of intersecting passages at a position axially spaced from said first pair of passages and wherein said valve body includes an axially extending connecting passage, said connecting passage fluidly connecting said pairs of passages when said valve is in said bypass position.

* * * * *

UNITED STATES PATENT AND TRADEMARK OFFICE
CERTIFICATE OF CORRECTION

PATENT NO. : 4,434,621
DATED : March 6, 1984
INVENTOR(S) : Dennis E. Barbeau

It is certified that error appears in the above—identified patent and that said Letters Patent is hereby corrected as shown below:

Column 5, line 34, delete "of" insert --or--.

Signed and Sealed this

Second Day of October 1984

[SEAL]

Attest:

GERALD J. MOSSINGHOFF

Attesting Officer

Commissioner of Patents and Trademarks